July 10, 1934.　　　　　F. M. CLARK　　　　　1,966,163
ELECTRIC DEVICE AND DIELECTRIC MATERIAL THEREFOR
Filed Sept. 29, 1932
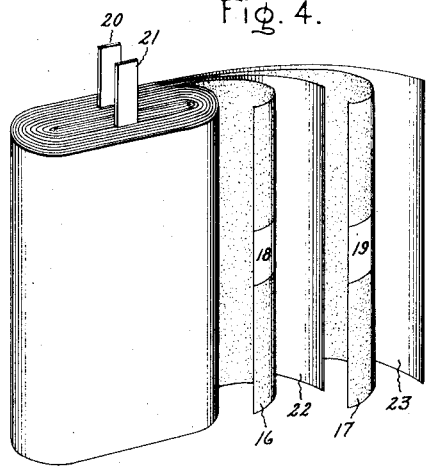
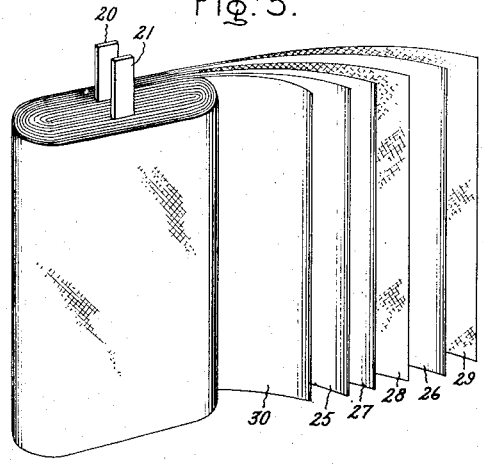
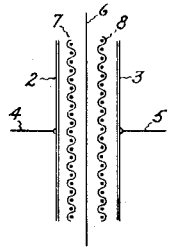
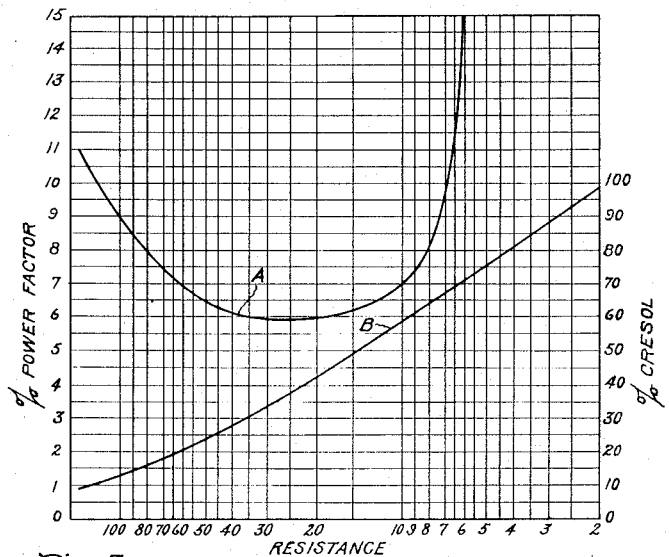
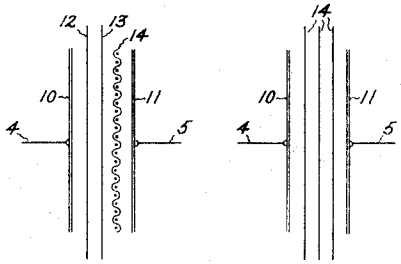
Inventor:
Frank M. Clark,
by Charles E. Tullar
His Attorney.

Patented July 10, 1934

1,966,163

UNITED STATES PATENT OFFICE 1,966,163

ELECTRIC DEVICE AND DIELECTRIC MATERIAL THEREFOR

Frank M. Clark, Pittsfield, Mass., assignor to General Electric Company, a corporation of New York Application September 29, 1932, Serial No. 635,388

21 Claims. (Cl. 175—41)

The present application is a continuation in part of my application Serial No. 572,523 filed November 2, 1931 and relates to electric capacitors and its object is to provide capacitors of improved efficiency. More particularly, the object of the invention is to secure capacitors of greatly increased capacity and reliability by the use of one or more semi-conducting layers, as described more fully hereinafter.

Heretofore, it has been believed to be necessary in the fabrication of capacitors which are provided with paper dielectric to employ a plurality of superimposed sheets of paper. The use of three sheets of paper rendered it extremely unlikely that conducting particles which may be present accidentally in each sheet would be in exact superimposed relation thus practically precluding short-circuiting by such particles and avoiding undue conduction losses.

The electric capacity of a capacitor unit has been expressed as follows by the United States Bureau of Standards:

$$C = 0.0885 \frac{(N-1)KS}{T}$$

C is capacity in micro microfarads; K is specific inductive capacity; S is the surface (in square centimeters); T is the distance between electrode plates in centimeters; N is the number of capacitor armatures or plates. A decrease in the space factor T obviously will increase C, the electric capacity.

As a consequence of my present invention, I have provided a highly efficient type of capacitor in which the high capacity characteristic of a super-thin dielectric may be secured without the accompanying danger of short-circuiting and other disadvantages resulting from conducting particles which may be accidentally present in the paper or other dielectric.

My invention, however, is not limited in its field of usefulness to a super-thin paper, or other high resistance septum, or sheet material.

In accordance with my invention I have provided a composite dielectric which is constituted in part of a high resistance septum, such as paper, nitro-cellulose, mica, or other high resistance material, and in part of a dielectric material having sufficient conductivity to function as though it constituted an extension or part of one or both of the capacitor armatures. In effect the armatures are separated only by a thin septum and consequently as high a capacity is obtained as would be obtained if the paper or other septum alone were present. The resistance of this composite dielectric, however, is too high to permit undue leakage current to take place through it, should one or more conducting particles be present in the high-resistance septum. As such dielectric, termed herein for convenience as a semi-conductor, I prefer to employ a non-aqueous, organic liquid of suitable resistivity and specific inductive capacity. As later shown, such semi-conductor may be constituted by a solid material.

When the resistivity of such semi-conductor, which may consist of a mixture of a substance of relatively high resistivity and a substance of relatively low resistivity, is chosen, as by properly proportioning such ingredients to fall within a range discovered by me, which is below the value regarded heretofore as practical, as hereinafter more fully explained, then energy loss in a capacitor containing such semi-conductor is materially decreased. While low energy loss can be obtained over a lowered range of resistivities as experimentally determined, for still lower resistivities of the semi-conductor below said range the energy loss again rises. This newly discovered phenomenon, whereby low energy loss is obtained with a resistivity which is lower than formerly was associated with high energy loss has been termed herein as the energy loss depression effect.

In order to insure the presence of a distinct film or layer of semi-conductor, there is preferably employed a spacing means adjacent at least one of the armatures, as for example, a porous fabric or other porous mineral material, such as an oxide coating on either one or both of the armatures. Over any range of spacing distances practical for capacitor manufacture the capacity is substantially independent of the thickness of the semi-conductor layer. As above explained, a capacitor made in accordance with my invention operates as though in effect the space factor were determined entirely by the thickness of the high resistance septum without regard to the total distance between the electrodes. This distinctive feature of my invention may be referred to as the space factor reduction effect.

In the accompanying drawing Figs. 1, 2 and 3 are diagrammatic representations of capacitors embodying my invention; Fig. 4 is a perspective view of a coiled-type capacitor, shown partly unrolled, and containing an oxide coating as a spacing means; Fig. 5 is a perspective view of a coiled-type of capacitor, shown partly unrolled, and containing a fibrous, porous material as a spacing means; and Fig. 6 is a graph showing the relation of the resistivity of a semi-conductor forming part of a capacitor dielectric and the dielectric losses (plotted as per cent power factor). The same figure also contains a graph showing the relation of resistivity to various mixtures of tricresyl phosphate and cresol.

Referring to Fig. 1, the capacitor there diagrammatically represented comprises the usual armatures, or plates, 2 and 3, to which terminal conductors 4 and 5 are attached. Between these armatures is located a septum 6 of material of high electrical resistance, as, for example, paper, and preferably a dense, imperforate paper. As above stated, this septum may consist of a single sheet of paper having a thickness of about .4 mils (0.0004"). For some purposes two or more sheets of paper may be preferable. Kraft paper suitable for the purposes of my invention is described in United States patent to Amos L. Allen, No. 1,850,702, dated March 22, 1932.

Between armature 2 and the septum 6 are spacers 7, 8 which may consist of a very porous medium, that is, a material having numerous interstitial spaces, such, for example, as cheese-cloth, porous kraft paper, blotting paper, muslin, silk, absorbent wood pulp fibre, or the like. Ordinarily a cloth spacer of a thickness of about four to seven mils is suitable. Cheese-cloth having a thread count of 20x12 and a thickness of about 5 mils is satisfactory for this purpose. When the armatures or plates consist of aluminum, I prefer to employ as the spacing means a porous mineral layer on one or both of the plates. An oxide layer which is porous may be produced in accordance with my prior Patent 1,846,844, dated February 23, 1932, (Reissue Patent No. 18,833).

Although very definite advantages accrue from the use of a single sheet of paper, using a spacing medium between each armature and the paper, in some cases other advantages may be gained by using two, or even three sheets of paper. One such arrangement is shown in Fig. 2, the armature plates being numbered 10, 11, and two paper layers being numbered 12, 13. A single spacer 14 is provided. The added sheets of paper lower the capacity of a given unit but raise the voltage range for which the capacity unit may be employed. In some cases the spacer may be entirely omitted, as shown in Fig. 3. In that event preferably three sheets of paper 14 are employed.

As a semi-conductor for the use above indicated my experiments have shown that I may employ a liquid or a liquid mixture having a resistivity within the range of about $1 \times 10^6$ to $1 \times 10^8$ ohms per centimeter cube at 25° C., the particular resistivity depending on the properties of the specific material employed, the construction and other conditions of any chosen capacitor. While in some cases materials which are not mixtures having inherently a resistivity within the desired range may be used, as, for example, technically pure dibutyl tartrate and technically pure nitrobenzene I prefer ordinarily to employ mixtures.

In general I employ a mixture consisting on the one hand of a material of high resistivity (greater than $1 \times 10^8$ ohms per centimeter cube) and good dielectric properties, which may be conveniently designated as Group A, of which tricresyl phosphate, triphenyl phosphate, dibutyl phthalate, trichlor benzene, and mineral oil, are examples, and on the other hand modify this material with a second material of relatively lower resistivity (less than $1 \times 10^8$ ohms per centimeter cube), designated as Group B, of which cresol, phenol, alpha naphthylamine, beta naphthol, aniline, acetic acid, dinitrobenzene, or furfural, are examples.

I have employed with success a mixture consisting by weight of about 60 to 70 parts tricresyl phosphate and about 40 to 30 parts cresol. Such mixtures have a resistivity ranging from about 2 to $4 \times 10^7$ ohms per centimeter cube when measured at 25° C. by the application of nine volts direct current. A mixture by weight of about 60 parts dibutyl phthalate and 40 parts cresol has a resistivity under the same conditions of about $1 \times 10^7$ ohms per centimeter cube. A mixture of about 90 parts dibutyl tartrate and 10 parts cresol has a conductivity under the given conditions of about $1 \times 10^7$ ohms per centimeter cube. The impregnation preferably occurs in accordance with the usual practice after the elements of the capacitors have been assembled. The impregnation may be carried out as described in my prior Patent 1,877,644 of September 13, 1932, the final mineral oil cooling bath being omitted.

In some cases a thickening material may be added to produce a solid or semi-solid, semi-conductor. A mixture by weight of 62 parts tricresyl phosphate, 33 parts cresol and 5 parts of shellac, the latter constituting the thickening material, results in a semi-solid material. The percentage of shellac can be increased if desired to form a more nearly solid material. For example, I may use by weight 44 parts of tricresyl phosphate, 44 parts cresol and 12 parts shellac. Various combinations of one or more of Group A and one or more of Group B materials may be used for the purposes of my invention.

In some cases the resistivity of the Group A product may be modified by heating to produce decomposition for the purpose of lowering the electrical resistivity. Apparently by the heat treatment, pyrogenic decomposition products result which are of the character of the Group B products. For example, an organic phosphate such as tricresyl phosphate or triphenyl phosphate may be heated at a temperature of 100° C. or higher. The length of heating depends on the temperature and initial purity of the material. With technical tricresyl phosphate I prefer to heat at 150° C. for a period of 24 hours. With more pure tricresyl phosphate the heating may have to be carried on for 24 hours or more. Technical tricresyl phosphate heated at 150° C. for periods up to 100 hours has given entirely satisfactory results.

An aryl phosphate, as, for example, tricresyl phosphate or triphenyl phosphate, may be heat-treated in a state of commercial purity as ordinarily obtained in the open market. Some filtration, as through fuller's earth, may be desirable, particularly in cases where water and other deleterious impurities are present, but ordinarily the filtration should not be carried any farther than necessary, as the heat-time requirement is thereby prolonged. Instances of most thorough filtration having prolonged the required time of heating to 72 hours have been noted. Ordinarily aryl phosphate in a commercial state of purity may be given the desired properties by heating for five to ten hours at 150° C. although in some instances 24 hours heat treatment has been found most satisfactory.

The dielectric constant of aryl phosphate is not much altered by this heat treatment, but when an aryl phosphate which has been subjected to heating is used for the impregnation of electric capacitors, it is found that the capacity of capacitors thus impregnated is materially higher than the capacitors impregnated with aryl phosphate which has not been heat-treated. This is presumably due to the fact that the resistivity of the treated aryl phosphate has been brought within the range necessary for the realization of the space factor reduction effect above referred to.

The capacity increase depends to a large extent on the character of the paper, or other solid dielectric material, used in such capacitors. In capacitors employing kraft paper as the solid dielectric material a capacity is obtained by impregnation with heat-treated material which is approximately three times greater than the capacity of a similar device impregnated with mineral oil of the type commonly employed in capacitors, and twice as great as a similar dielectric treated with tricresyl phosphate which has not been heat-treated. When linen paper is employed as a dielectric material the capacity after impregnation with heat-treated material is about four times the capacity of a similar oil impregnated device and about two and one-half times the capacity of the same dielectric treated with tricresyl phosphate which has not been heat-treated. When cotton paper is employed as a dielectric material the capacity after impregnation with heat-treated material may be as high as fifteen times the capacity of a similar oil-impregnated device and about five times the capacity of a similar dielectric treated with tricresyl phosphate which has not been heat-treated.

The power factor which is a measure of dielectric loss, in capacitors depends also on the type of composite dielectric material used as well as on the length of time of heat treatment of an ester phosphate or the like. For example, in a capacitor containing kraft paper which has been impregnated by heating for about six hours at 150° C. with tricresyl phosphate which has not been heat-treated as above described, the power factor is about 12 to 15%. In a similar capacitor impregnated in the same manner using tricresyl phosphate preheated from about 24 to 26 hours at 150° C. the power factor is about 8%. In similar capacitors containing linen or cotton paper the power factor values are higher, other conditions being the same. In capacitors containing linen paper the power factor value on the average is about 30%. In capacitors containing cotton paper the power factor value is within the general range of about 40 to 50%. It is assumed that heat-treated tricresyl phosphate is employed as the impregnant in each instance. In some cases advantages may be obtained by using combinations of different kinds of paper. Kraft paper particularly, when combined with linen or cotton paper, results in a lower power factor than linen or cotton paper alone. While the capacity is decreased somewhat it is higher than the capacity obtained by using the same thickness of kraft paper.

Although in the illustrative examples particular reference has been made to tricresyl phosphate, and triphenyl phosphate, other esters, as for example tributyl phosphate, can be similarly heat-treated with corresponding beneficial results.

In capacitors intended for operation on alternating current circuits, it is important to secure not only maximum capacity with a unit of given size but also minimum energy loss, as expressed by power factor. As later explained, under some conditions a high capacity may be utilized even though the accompanying power factor is high. The minimum power factor may be obtained by a selection of conductivity of the semi-conductor in the composite dielectric.

In Fig. 6 the relation of power factor and resistivity of an impregnating liquid comprising a tricresyl phosphate and cresol mixture is represented by graph A, the abscissae of which are resistivity values and the ordinates power factor values. The resistance values are plotted on logarithmic scale as ohms per centimeter cube when multiplied by $10^6$. The lowest power factor values are obtained when the resistivity of this semi-conductor falls within a range of $1.4 \times 10^7$ to $4.5 \times 10^7$ ohms per centimeter cube. In the case of a mixture of tricresyl phosphate and cresol, this range corresponds to a cresol content falling roughly in the range of about 25 to 50% by weight. As will be seen from the curve a power factor below 10% may be obtained by the use of any mixture of these substances yielding a resistivity from about $7 \times 10^6$ to $1 \times 10^8$ ohms per centimeter cube. The relation of cresol content to resistance is indicated by the graph B, the ordinates for which are shown in the right hand scale.

The dielectric constant is substantially constant over the preferred range of tricresyl phosphate-cresol mixtures, being about 7. The electric capacity of a given capacitor unit does not vary substantially with variations of cresol content in a range of 25 to 50%.

The capacitors may be assembled by rolling, stacking, or otherwise, as well understood in the art. In Fig. 4 is shown one representative construction. Strips 16, 17 of aluminum foil are oxidized chemically or electrolytically. Preferably a track as indicated at 18 and 19 in the respective sheets is left unoxidized. The track may be coated, prior to the oxidizing treatment, with some inert protective material, such as nitrocellulose, such material later being removed. These unoxidized tracks render it convenient to make electrical contact between the terminals 20, 21 and the armatures 16, 17. Paper sheets 22, 23 act as the septum as explained in connection with Fig. 1, kraft paper being preferred.

In the structure shown in Fig. 5 a fibrous spacer, such as cheese cloth, is employed. The capacitor armatures or plates are constituted by strips of aluminum foil 25, 26. Between these two foil strips is a paper septum 27 and a cloth spacer 28. On the opposite side of the foil 26 is a cloth spacer 29 and on the opposite side of the foil 25 is a paper strip 30. When these strips are wound, the plates, spacer and septum are brought into proper relation as indicated in Fig. 1. Terminals 20 and 21 contact with the armatures 25 and 26. The assembled units are impregnated by immersion in the liquid semi-conductor.

Illustrative figures of capacity and power factor for capacitors containing respectively kraft, linen and cotton papers have been given above. In general the more porous the paper or other septum, the higher is the capacity but such high capacity is coupled with a correspondingly high power factor. Cotton paper being the most porous gives the highest capacity and power factor. When cotton paper is calendered, making it more dense, the capacity and power factor are reduced.

As above explained, combinations of a dense septum, such as kraft paper and a porous material, which acts as a spacer, are preferred, and such combinations give the best combination of favorable capacity and power factor, the capacity being unaffected by the thickness of the spacer between practical limits. I have employed spacers ranging in thickness from .3 to 5 mils.

The improved results obtained by the practice of my invention may be noted from the following comparative figures.

A given capacitor of standard construction employing three sheets of $\tfrac{1}{2}$ mil kraft paper as the dielectric septum when impregnated with mineral wax has a volume of 5.4 cubic inches for a capacity of one microfarad. Expressed otherwise said capacitor having a volume of one cubic inch would have a capacity of .185 m. f. When impregnated with mineral oil such a capacitor requires a slightly greater volume, namely about 6 cubic inches.

However, when the given unit is impregnated with a mixture of 65 parts tricresyl phosphate and 35 parts cresol a capacity of one microfarad is obtained for a volume of .45 cubic inch, which corresponds to a capacity of 2.22 m. f. per cubic inch. The volume required for a given capacity is reduced to less than one tenth of the wax combination. In other words, for a capacitor of one cubic inch volume, the electric capacity is increased 12-fold. The power factor while being increased still is favorable being less than five per cent.

When a septum is one sheet of .4 mil kraft paper and a spacer of oxide film on aluminum plates is employed a volume of only .2 cubic inch is required for a capacity of one microfarad. The power factor is less than five per cent. If higher power factor values are permissible for good performance, as would be the case for some capacitor uses on direct current circuits, then still greater capacity for unit volume may be obtained.

In my application Serial No. 656,686 filed February 14, 1933 as a division of the present application, claims have been made on a composition comprising an alkyl phthalate and cresol and on an electric capacitor containing such composition.

What I claim as new and desire to secure by Letters Patent of the United States, is,—

1. An electric capacitor comprising juxtaposed armatures, paper about one-half mil in thickness therebetween, means for spacing at least one of said armatures from said paper and a non-aqueous liquid organic material in the space thus afforded, said liquid having a resistivity in a range lying between limits of about $1 \times 10^6$ to $1 \times 10^8$ ohms per centimeter cube.

2. An electric capacitor comprising aluminum electrodes and a composite dielectric therebetween constituted of paper, an oxide layer on at least one of said electrodes facing said paper, and a mixture of tricresyl phosphate and a phenolic material wetting said oxide layer and paper, said mixture having a resistivity within an energy loss depression range.

3. In a capacitor, an impregnating composition of non-aqueous organic character consisting essentially of a material having a resistivity greater than $1 \times 10^8$ ohms per centimeter cube at 25° C. and another material having a resistivity less than $1 \times 10^3$ ohms per centimeter cube at 25° C., said materials being combined in proportions producing a resultant resistivity within the range of $1 \times 10^6$ to $1 \times 10^8$ ohms per centimeter cube at 25° C.

4. An electric capacitor comprising the combination of juxtaposed armatures, a dielectric sheet material separating said armatures and a non-aqueous organic semi-conducting layer co-extensive with said sheet material, said semi-conducting layer consisting of a mixture of a substance having a relatively high resistivity with a substance having a relatively low resistivity, the ingredients of said mixture being proportioned to give a resultant resistivity in a region of low power factor values which is between regions of high power factor values corresponding to ranges of higher and lower resistivities resulting respectively from a proportionate decrease or increase of said substance of relatively lower resistivity in said mixture.

5. An electric capacitor comprising the combination of juxtaposed armatures, a dielectric sheet material separating said armatures and a non-aqueous organic liquid semi-conductor wetting said sheet material, said semi-conductor consisting of a mixture of a substance having a relatively high resistivity with a substance having a relatively low resistivity, the ingredients of said mixture being proportioned to give a resultant resistivity in a region of low power factor values which is between regions of high power factor values corresponding to ranges of higher and lower resistivities resulting respectively from a proportionate decrease or increase of said substance of relatively lower resistivity in said mixture.

6. In an electric capacitor a non-aqueous organic liquid impregnating medium having a resistivity in a range lying between $1 \times 10^6$ to $1 \times 10^8$ ohms per centimeter cube whereby energy loss and space factor reduction effects are obtained.

7. An electric capacitor comprising juxtaposed electrodes and a composite layer therebetween comprising a septum of dielectric material, means for mechanically spacing at least one of said electrodes from said septum and a semi-conducting non-aqueous organic liquid in the space thus afforded, said semi-conducting liquid having a resistivity in a range lying between the limits of about $1 \times 10^6$ and $1 \times 10^8$ ohms per centimeter cube whereby the energy loss in said capacitor is materially lower than in a similar capacitor containing a semi-conducting liquid having a resistivity outside of said range.

8. An electric capacitor comprising juxtaposed plates at least one of which is coated with a layer of mineral material, a sheet of kraft paper therebetween, and a non-aqueous organic liquid wetting said paper and said mineral layer, said liquid having a resistivity in a range lying between limits of about $1 \times 10^6$ to $1 \times 10^8$ ohms per centimeter cube.

9. An electric capacitor comprising juxtaposed electrodes of metal, at least one of which has thereon an adherent, porous oxide layer, a substantially imperforate dielectric septum between said electrodes, and a non-aqueous organic liquid material wetting said septum, said liquid material having an electrical resistivity in a range lying between limits of about $1 \times 10^6$ to $1 \times 10^8$ ohms per centimeter cube at 25° C.

10. In a capacitor, an impregnating composition consisting essentially of an aryl phosphate and a phenolic material so proportioned as to have a resistivity within an energy loss depression range.

11. In a capacitor, an impregnating composition consisting essentially of tricresyl phosphate and cresol, said composition having a resistivity whereby an energy loss depression effect is obtained.

12. In a capacitor, an impregnating composition consisting essentially of butyl tartrate and cresol, said composition having a resistivity in an energy loss depression range.

13. In a capacitor, an impregnating composition consisting essentially of an aryl phosphate and an alpha naphthylamine, said composition having a resistivity in an energy loss depression range.

14. In a capacitor, an impregnating composition consisting essentially of tricresyl phosphate and a phenolic material so proportioned as to have a resistivity in an energy loss depression range.

15. In a capacitor, an impregnating composition in which an aromatic ester phosphate and a phenolic material constitute essential ingredients, so proportioned as to have a resistivity in an energy loss depression range.

16. In an electric capacitor, a dielectric layer and a layer consisting essentially of a mixture of saturated aliphatic ester phosphate and a sufficiently large amount of phenolic material to cause the electrical resistivity of the mixture to be in a range lying between limits of about $1 \times 10^6$ to $1 \times 10^8$ ohms per centimeter cube.

17. An electric capacitor made up of sets of conducting material separated by paper, said capacitor being impregnated with a mixture of about 70 to 60 parts of tricresyl phosphate and about 30 to 40 parts of cresol.

18. An electric capacitor comprising electrodes, a cellulosic dielectric layer interposed between said electrodes and a medium wetting said layer consisting by weight of about 65 parts of tricresyl phosphate and about 35 parts cresol.

19. In a capacitor, a composition consisting essentially of tricresyl phosphate, cresol and shellac, so proportioned as to have a resistivity in an energy loss depression range.

20. An electric capacitor comprising juxtaposed electrodes and a composite layer therebetween comprising a septum of material having sufficient resistance to confine leakage current therethrough under working conditions to an inappreciable fraction of the charging current of said capacitor, superimposed means for mechanically spacing at least one of said electrodes from said septum and a liquid non-aqueous organic material in the space thus afforded having a resistivity in a range lying between limits of about $1 \times 10^7$ to $4 \times 10^7$ ohms per centimeter cube.

21. In a capacitor, an impregnating composition in which an ester phosphate and a phenolic material constitute essential ingredients, so proportioned as to have a resistivity within an energy loss depression range.

FRANK M. CLARK.